United States Patent
Bond et al.

(10) Patent No.: US 7,533,101 B2
(45) Date of Patent: May 12, 2009

(54) EXTENSIBLE LOADER

(75) Inventors: Barry Bond, Maple Valley, WA (US); ATM Shafiqul Khalid, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 10/090,650

(22) Filed: Mar. 4, 2002

(65) Prior Publication Data

US 2003/0177129 A1 Sep. 18, 2003

(51) Int. Cl.
*G06F 7/00* (2006.01)
*G06F 9/44* (2006.01)
*G06F 11/30* (2006.01)

(52) U.S. Cl. .................... 707/100; 717/135; 713/187

(58) Field of Classification Search .............. 707/100; 717/4, 120, 135; 714/38; 713/187
See application file for complete search history.

(56) References Cited

U.S. PATENT DOCUMENTS

| | | | | |
|---|---|---|---|---|
| 5,469,574 A * | 11/1995 | Chang et al. | ............... | 717/106 |
| 5,548,759 A * | 8/1996 | Lipe | ............... | 707/100 |
| 5,673,429 A * | 9/1997 | Minatogawa et al. | ....... | 707/100 |
| 5,708,811 A * | 1/1998 | Arendt et al. | ............... | 717/163 |
| 5,764,987 A * | 6/1998 | Eidt et al. | ............... | 717/100 |
| 5,892,904 A * | 4/1999 | Atkinson et al. | ............... | 726/22 |
| 6,038,565 A * | 3/2000 | Nock | ............... | 707/101 |
| 6,141,698 A * | 10/2000 | Krishnan et al. | ............ | 719/331 |
| 6,219,830 B1 * | 4/2001 | Eidt et al. | ............... | 717/139 |
| 6,230,316 B1 * | 5/2001 | Nachenberg | ............... | 717/169 |
| 6,367,012 B1 * | 4/2002 | Atkinson et al. | ............ | 713/176 |
| 6,636,942 B2 * | 10/2003 | Greco | ............... | 711/112 |
| 6,662,186 B1 * | 12/2003 | Esquibel et al. | ............ | 707/101 |
| 6,687,749 B1 * | 2/2004 | Chavez et al. | ............... | 709/223 |
| 6,738,932 B1 * | 5/2004 | Price | ............... | 714/38 |
| 6,742,176 B1 * | 5/2004 | Million et al. | ............... | 717/120 |
| 6,802,006 B1 * | 10/2004 | Bodrov | ............... | 713/187 |
| 6,959,339 B1 * | 10/2005 | Wu et al. | ............... | 709/246 |
| 7,093,239 B1 * | 8/2006 | van der Made | ............. | 717/135 |

OTHER PUBLICATIONS http://www.ssw.uni-linz.ac.at/Teaching/Lectures/Sem/2001/Literatur/FileFormatSpec.doc.*

* cited by examiner

*Primary Examiner*—Etienne P LeRoux
*Assistant Examiner*—Cindy Nguyen
(74) *Attorney, Agent, or Firm*—Lee & Hayes, PLLC

(57) ABSTRACT

An implementation of a technology is described herein for operating systems and loaders of executable images. Furthermore, the technology, described herein, facilitates the adoption and recognition by an operating system of an otherwise unsupported executable-image format by increasing the ease with which an executable-image loader may be modified. This abstract itself is not intended to limit the scope of this patent. The scope of the present invention is pointed out in the appending claims.

16 Claims, 7 Drawing Sheets

EXTENSIBLE LOADER

TECHNICAL FIELD

This invention generally relates to operating systems and loaders of executable images.

BACKGROUND

One of the functions of an operating system ("OS") is the load and run executable "images." These "images" are typically stored files that are designed to be loaded into the memory of a computer. When control of the processor is passed to an "image" in memory, it executes (or "runs") that image. These may be, for example, applications, programs, program modules, program libraries, and the like. A reference herein to loading files expressly refers to loading stored executable images.

Loaders

It is normally the responsibility of the OS to load executable images into memory, create relevant sections that it understands, and then start executing the program. Typically, the part of the operating system that loads and executes executable images is called an "executable-image loader" (or more simply, a "loader").

Generally, there are two typical types of loaders: relocating and absolute. The absolute loader is the simplest and quickest of the two. The loader loads a file into memory at the location specified by the beginning portion (i.e., header) of the file; it then passes control to the program. If the memory space specified by the header is currently in use, execution is unable to proceed, and the user must wait until the requested memory becomes free.

The relocating loader will load the program anywhere in memory, altering the various addresses as required to ensure correct referencing. With such a type of relocating loader, the decision as to where in memory the program is placed is done by the OS, not the program's header file. This is more efficient, but introduces a slight overhead in terms of a small delay whilst all the relative offsets are calculated.

Typically, a loader is unnecessary for interpreted languages, as the executable code is built up into the memory of the computer.

Formats of Executable Images

Typically, the loader of an OS supports specific formats of executable images. Below is an example of a typical format for an executable image commonly referred to as an "exe" or ".exe" format. Such format is employed and supported by existing popular brands of OS for personal computers.

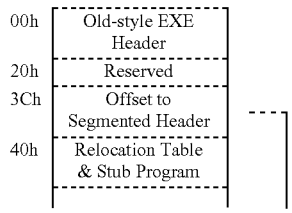

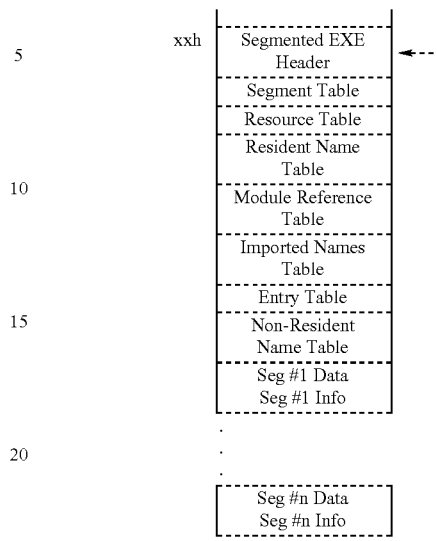

Example of a typical "exe" format

The set of formats (of executable images) that an OS is specifically designed to understand, load into memory, and execute are "supported" formats for that OS. Conversely and conventionally, "unsupported" formats for an OS are the formats that an OS is not specifically designed to understand, load into memory, and execute. In other words, a loader of an OS is unable to load and execute executable images of an unsupported format.

Support for Otherwise Unsupported Formats

However, sometimes it is desirable to load and execute some executable images having an unsupported format. For example, loading 32-bit program modules designed for an X86 platform on computer having a 64-bit platform (which includes a 64-bit operating system and 64-bit hardware) may result in an error and perhaps a user will see a message like "Invalid Image Format." Assuming that the loader for the 64-bit platform is not specifically modified to accommodate 32-bit program modules, such modules have an unsupported format.

Why would it be desirable for an OS to load images having otherwise unsupported formats? The most common answer to the question is "backwards compatibility." It may be desirable for a native OS to emulate another (or non-native) OS so that program modules designed for operation with the non-native OS to operate with the native OS. In other words, the native OS (or a portion thereof) may emulate a non-native OS.

In such situations, although the emulator may accommodate the non-native executable image, the native loader (of the native OS) may not recognize the unsupported (i.e., non-native) format of the non-native executable image. Consequently, the native loader may refuse to load and execute the non-native executable image despite the existence of the emulator that can accommodate such module.

The conventional approach to address this issue is to modify the native loader (of the native OS). Such a modification may also be called a re-write, re-design, and the like. Typically, these modifications are made with backwards compatibility in mind so that the native loader will recognize the otherwise unsupported format of an image and load it.

Because of these modifications, a loader of such an OS is littered with hard code designed to identify, locate, map, and search out various formats of non-native images. Each time a new format arrives along with its emulator, the loader of the OS must be rewritten.

Time-Consuming Loader Modifications

Conventionally, modifying the loader of an OS in the manner described above is labor-intensive and time-consuming. It also requires programmers with an extraordinarily high skill level to successfully modify a loader appropriately. This typically requires decisions and actions from the original manufacturer of the OS to accomplish such modifications. Consequently, the time between recognition of a need to dissemination of a solution was great.

SUMMARY

Described herein is a technology for operating systems and loaders of executable images. Furthermore, the technology, described herein, facilitates the adoption and recognition by an operating system of an otherwise unsupported executable-image format. It may do so by increasing the ease with which an executable-image loader may be modified to accommodate for the otherwise unsupported executable-image format.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of an Extensible Loader that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of an Extensible Loader may be referred to as an "exemplary extensible loader."

Introduction

Figure 7:
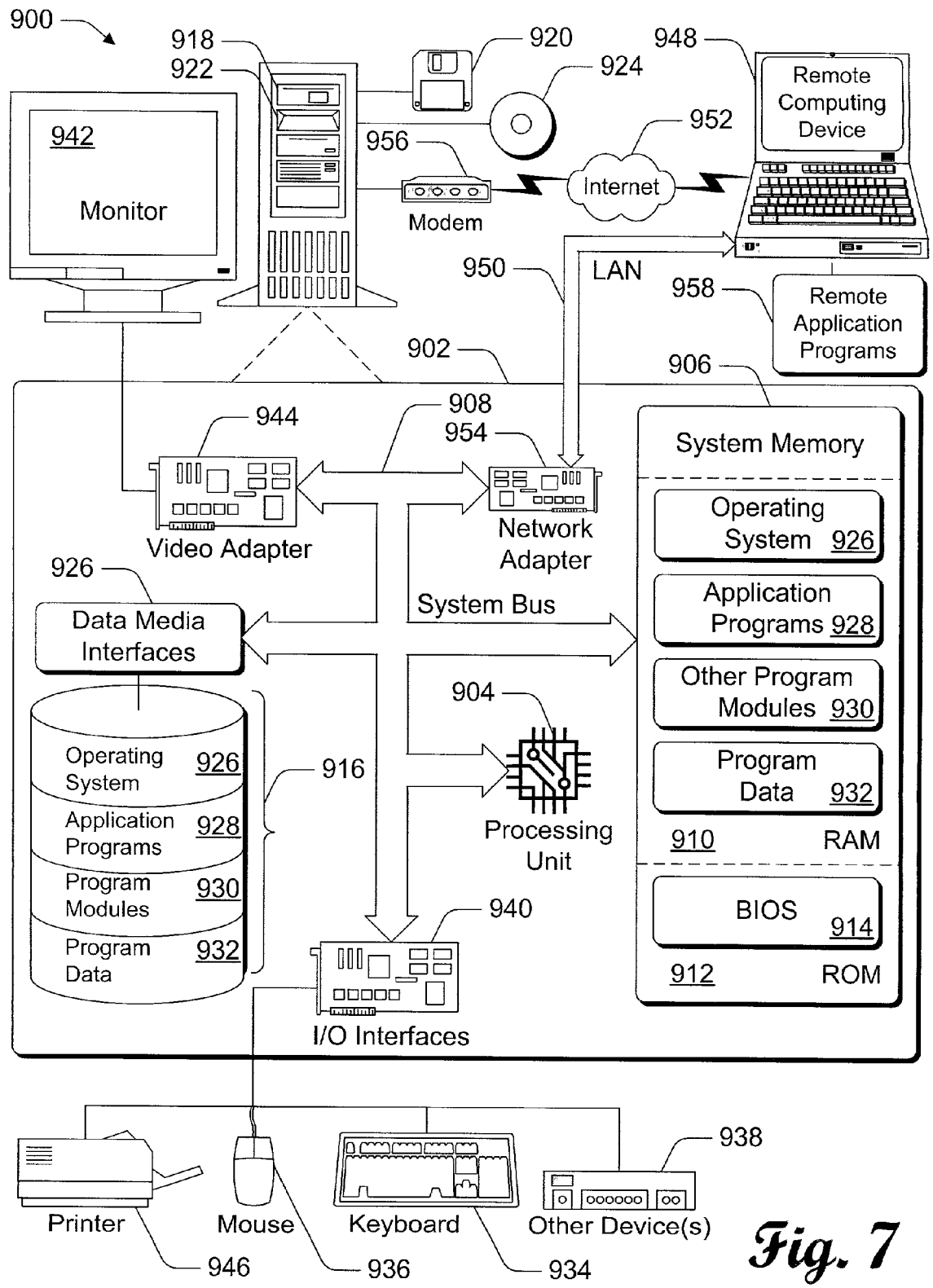
FIG. 7 is an example of a computing operating environment capable of implementing an implementation (wholly or partially) as described herein.

The one or more exemplary implementations, described herein, of the present claimed invention may be implemented (in whole or in part) by a modulized loaders 200 or 300 and/or by a computing environment like that shown in FIG. 7.

For various reasons (e.g., promotion of backward compatibility or cross-platform compatibility), it is desirable for an operating system (OS) to load and execute otherwise non-native executable images. Such images have an otherwise unsupported format. The conventional approach is to modify the native loader (of the native OS) so that the native loader will recognize the otherwise unsupported format of an image and load it. Because of these modifications, a loader of such an OS is littered with hard code designed to identify, locate, map, and search out various formats of non-native images.

Conventionally, modifying the loader of an operating system (OS) in the manner described above is labor-intensive and time-consuming. It also requires programmers with an extraordinarily high skill level to successfully modify a loader appropriately.

Also, it may be desirable for an OS to support the execution of images from multiple platforms by using a simulator/emulator. It might be impractical to know before shipping the OS what type of application that a user might simulate/emulate. With the exemplary extensible loader, if one installs a custom simulator/emulator, one can also install a customized loader to extend OS features on the fly (i.e., without extensive loader redesign by a high level programming team—like that of the OS manufacturer).

Typical Computer Architecture Employing a Loader

A typical computer architecture employs a loader. The exemplary extensible loader may be used as such a loader. Typical computer architecture is multi-layered. From the bottom up, it includes the hardware layer, the operating system (OS) layer, and the application layer. Alternatively, these layers may be described as the hardware layer, the kernel mode layer, and the user mode layer.

Figure 1:
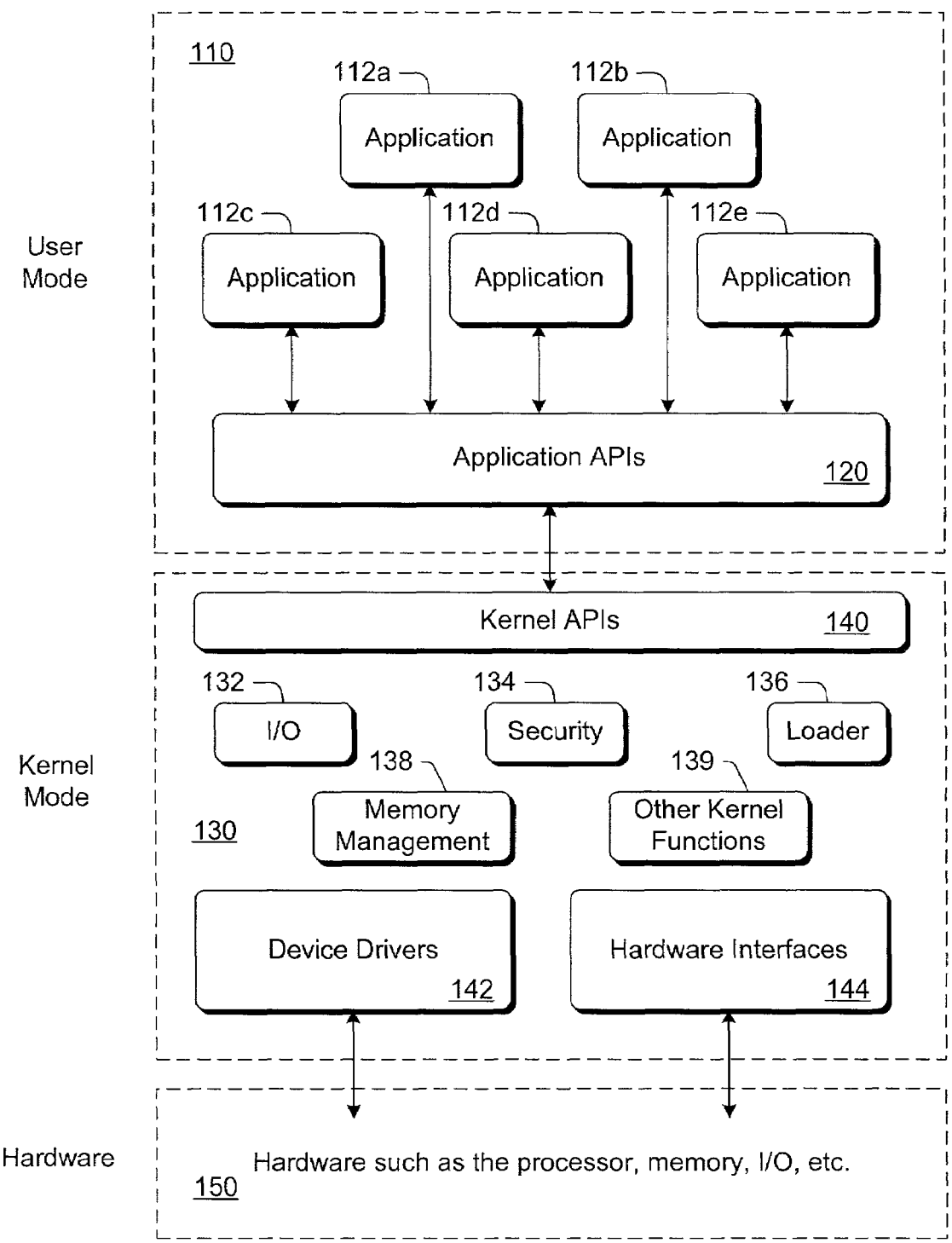
FIG. 1 is a schematic block diagram showing an example of typical computer architecture, within which an implementation described herein may be implemented.

FIG. 1 illustrates the layers of an example of typical computer architecture 100. The top of the architecture is the user mode 110. It includes applications, such as applications 112*a-e*. These applications communicate with a set of APIs 120. Typically, this API set is considered part of the OS, and thus, part of the computing platform.

The next layer of the architecture is the kernel mode 130. This may be generally called the "kernel" of the OS. Since it is part of the OS, it is part of the computing platform.

A kernel of an OS is the privileged part of the OS—the most trusted part of the OS. It is an inner layer of code. It typically operates I/O 132, security 134, loader 136, memory management 138, and other privileged functions 139. The kernel has sole access to the hardware in the hardware layer 150 via device drivers 142 and other hardware interfaces 144.

Kernel APIs 140 are those APIs within the kernel that arbitrate access to the kernel functions. The applications typically do not call the kernel directly. Instead, the applications call the APIs 120 and the APIs, in turn, may call the kernel (in particular the kernel APIs 140).

Below the kernel mode 130, there is the hardware layer 150. This layer includes all of the hardware of the actual computer. This includes the processor(s), memory, disk I/O, other I/O, etc. The platform also includes the hardware layer.

Therefore, a computing platform includes the hardware layer, the kernel layer, and typically the user-mode APIs 120. Typically, the loader is part of the kernel of the OS.

Exemplary Extensible Loader

With the exemplary extensible loader, the loader of the OS is customizable and extensible. The exemplary extensible loader may be implemented in a modulized manner (i.e., an object-oriented manner).

Therefore, each time one wishes to utilize an otherwise unsupported image format for an OS, a loader programmer need only change the modules (i.e., objects) of the loader, rather than rewrite the loader.

Unlike a conventional monolithic loader—which must be completely redesigned to accommodate otherwise unsupported image formats—the exemplary extensible loader has several relatively easily customizable modules.

Figure 2:
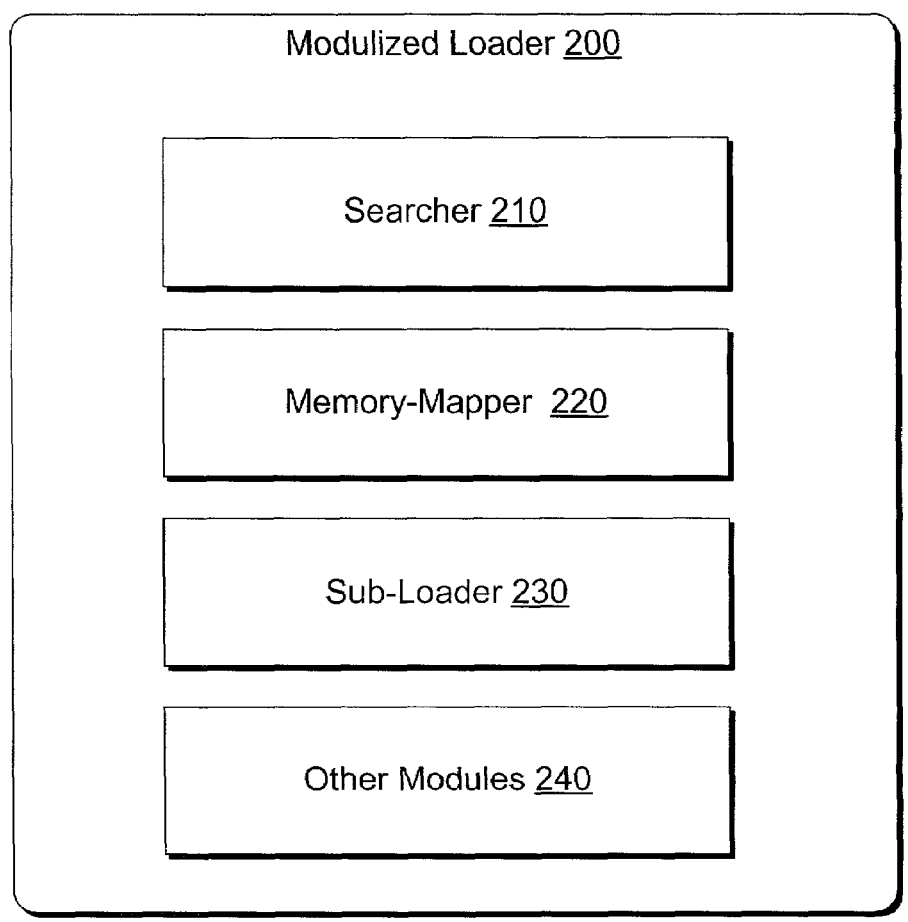
FIG. 2 is a schematic block diagram showing an implementation described herein.

FIG. 2 shows a modulized loader 200. Such loader would replace the loader 136 of FIG. 1. Although the modulized loader 200 may include many other modules 240 (performing various functions), the loader 200 of FIG. 2 illustrates the following exemplary modules:

a searcher 210 for searching the media (e.g., hard disk) for the image to load;

a memory-mapper 220 for loading and mapping that image into memory;

a sub-loader 230 for examining import/export tables of that image to determine if additional images need to be loaded; if so, loading them.

Figure 3:
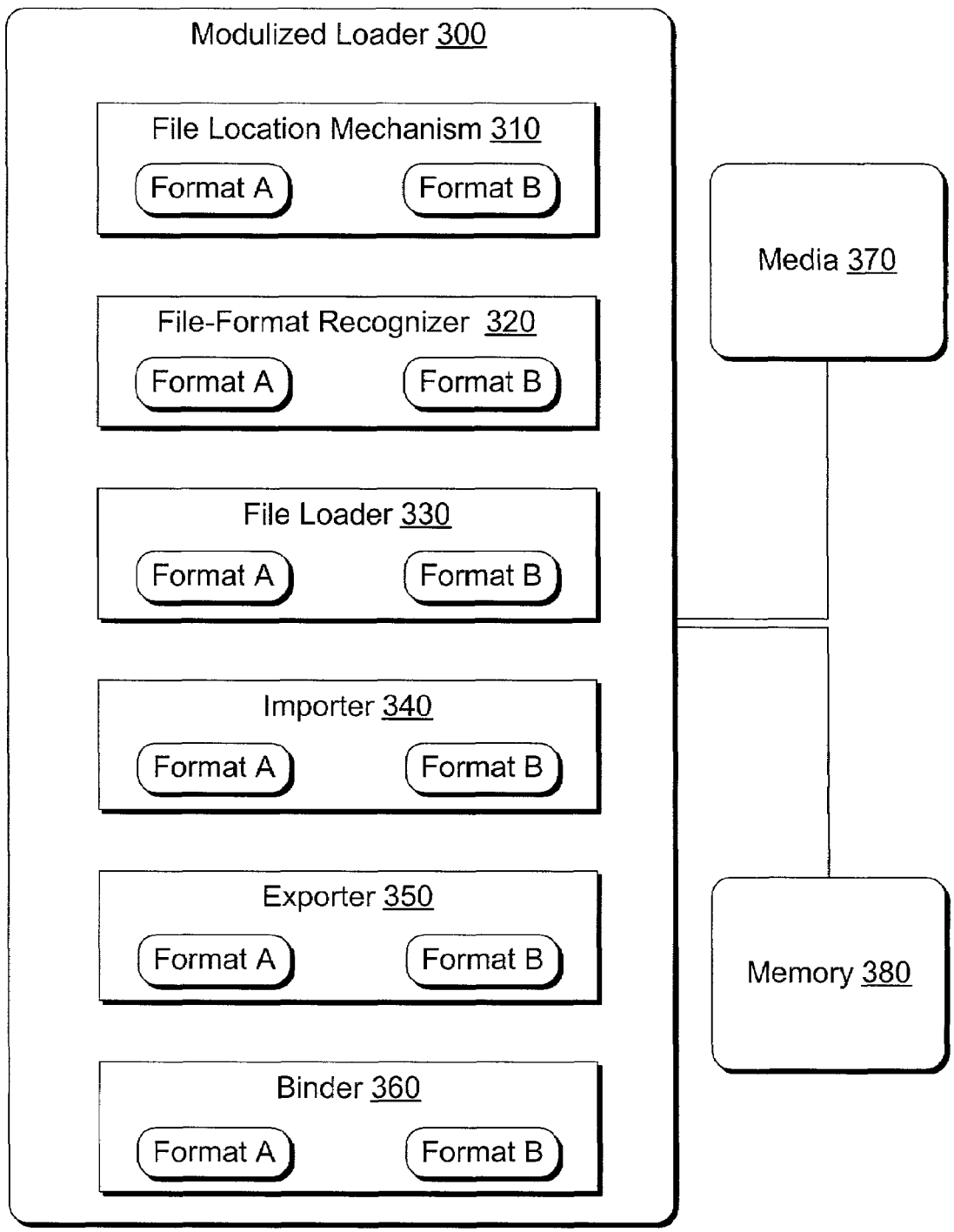
FIG. 3 is a schematic block diagram showing an implementation described herein.

FIG. 3 shows another possible implementation of the modulized loader 300 of the exemplary extensible loader. This loader would replace the loader 136 of FIG. 1. The loader 300 of FIG. 3 illustrates the following exemplary modules:

A file location mechanism 310 (i.e., file locator), given the name of an executable image (and possibly additional data about it such as a requested version number), locates that module within the file system of the media 370. This may also include downloading the file from a remote computer or even from the Internet.

A file-format recognizer 320 is responsible for recognizing the file format (after that the file has been located on the media). Also, it may select which of the available pluggable sub-loaders is capable of loading the identified format. Sub-loaders are the portions of the loader designed to load specific formats of executable images.

A file loader 330 (i.e., a memory-mapper) opens the file from the media 370 and reads it into memory 380.

An importer 340 finds the list of an executable image names to load (from the in-memory view of the file). It loads them. These executable images may be loaded by recursion in the extensible loader.

An exporter 350 builds a representation of the APIs that an executable image exports. Exports are usually name/address pairs.

A binder 360 "links" the executable image together—given that the executable image and the executable images it imports are all loaded in the memory 380. It is responsible for converting the symbolic cross-image references (i.e., DLL name and API name pair) into physical addresses, by reading input from the importer 340 and resolving imported names against the list of name/address pairs provided by the exporter 350.

As illustrated in FIG. 3, each of the above modules (310-360) includes multiple components and each component is designed for a specific executable image format (e.g., Format A and Format B). For example, Format A may be for PE32-formatted executable images while Format B may be for ELF-formatted executable images.

Universal Image Format

The exemplary extensible loader may load images having a universal image format. With such a format, the classes and sub-classes of typical objects of an image format may be defined.

The format of an executable image may include, for example, a universal image header section. The section may have an entry called signature or identification number that can uniquely identify the specific loader it was targeted to be used while loading. Some GUID or value can work as a signature. The section might also contain certain information readable to user in case the loaded is missing.

There may be one configuration table in the system that will hold all the entry that can be searched by an ID to get a matching native image (i.e., exemplary extensible loader for that ID or signature). System registry can be such place.

Those entries might look like <signature, Ext_Loader location>.

The entry table can also be rearranged based on application name where the entry might look like <application name, Ext_Loader location>. This can help to apply custom loading operation on a particular application.

The Ext_Loader location will point to a physical image on the system. That image may be supported in the system either natively or by the exemplary extensible loader.

The exemplary extensible loader may have a well defined entry point which the system can call. The name of the entry point might look like "Load Image".

For example, with some the 32-bit versions of the "Windows" brand OS (from the Microsoft Corporation), they use "PE/COFF" format for .EXE and .DLL files while a 64-bit OS uses "PE32+". Many Unix systems use "ELF" format, which comes in 32-bit and 64-bit variants. Some older Unix systems use COFF.

In general, PE/COFF is an extension to the original COFF format. These formats describe the layout of the disk file and how it should be represented in memory.

The following references provides a good description of PE/COFF files: "Peering Inside the PE: A Tour of the Win32 Portable Executable File Format," Matt Pietrek, Microsoft Systems Journal, March 1994. Similarly, the following provides a good description of ELF: "Extending Sim286 to the Intel386 Architecture with 32-bit processing and Elf Binary input," Michael L. Haungs, UC Davis, Computer Science Dept (Parallel and Distributed Computing Lab), September 1998. Other alternative file formats may be loaded as well (e.g., Java class files).

Modulization Difficulties

Conventional loaders are monolithic. They are not modulized. Furthermore, they are not designed to be easily modified to accommodate differing formats of executable images.

With the exemplary extensible loader, a heterogeneous collection of modules may be loaded into one process. A typical OS only understands a limited set of formats—their native format only. With the exemplary extensible loader, native and non-native formatted processes may be loaded.

For example, the loader of conventional 32-bit variants of the "Windows" brand of OS (from the Microsoft Corporation) understands only PE/COFF. On conventional x86 FreeBSD, the loader understands "a.out" and ELF (and no others) formats, but each process may contain only one format or the other. However, with the exemplary extensible loader, a single process may contain a mix of "a.out" and ELF images, and possibly even PE/COFF ones, all sharing one core loader.

In addition, the exemplary extensible loader may be extensible at run-time on the target machine. With traditional monolithic loaders, new executable file formats may be added, but such action requires recompilation of the loader code on the developer's machine, then deployment to the user's machine. However, with an OS with the exemplary extensible loader, it is possible for individual applications to provide their own loader extensions when the application is installed onto the machine.

Subsystems within the loader are isolated with clean interfaces. This makes it easy to create "filter loaders", which inherit from an existing file-format loader, but provide additional value. An example of such a scenario is a loader decrypting a binary file as it loads it. In such an example, the decrypting loader could use the existing PE/COFF loader, but override the part of the PE/COFF loader that reads the on-disk file into memory, so instead of just reading the file, it is decrypted during the load.

Outside of the Context of Emulators

Although a typical application for the exemplary extensible loader may be within the context of simulator/emulator of a non-native platform, other applications exist. The exemplary extensible loader is applicable to any application where it may be desirable to quickly and easily modify a loader of an OS so that it can recognize, load, and execute an executable image having a format that would otherwise be unsupported.

An example of such an application is security. The new and otherwise unsupported format may include, therein, a natively formatted image. Thus, this new and otherwise unsupported format may encapsulate the native format. Therefore, without the modified version of the exemplary extensible loader, the image there within is inaccessible. Encapsulation is a desirable to enhance efficient security (e.g., protection via encryption), compression, and the like for the executable image there within.

A conventional or non-customized loader cannot load such versions. However, a customized loader may load them. The publisher may, for example, supply the loader modules necessary to load these encapsulated images. After this proprietary loader module decrypts and/or decompresses the images, it may call the original loader modules of the OS and proceed otherwise normally.

With the exemplary extensible loader, independent software vendors (ISVs) have more control regarding the deployment of their applications on an OS. With conventional loaders, ISVs simply cannot take control over execution environment until their program module is loaded. If that module is formatted in a manner unfamiliar to the loader (e.g., when it is encrypted or encoded), then the loading operation fails.

Conventionally, a computer cannot execute a compressed or encrypted program directly. Instead, a decompressor/decrypter is loaded to decompress/decrypt the image (having a supported image) and store it on the computer's media. Then, the loader may load and execute the image.

However, with the exemplary extensible loader, the loader may be quickly and easily modified so that the updated loader may load, decode/decrypt, and execute without any intervening manual steps. For example, a decrypting object-oriented loader may operate by subclassing the standard loader, so that it decrypts the image, but then falls back to the base class (of the standard loader) to pick up common functionality such as reading the import table or applying relocations. A good specific example of this is loading PE/COFF images with the 64-bit platform, where PE32+ and PE/COFF are very similar, but just different enough that there are have two completely separate loader implementations to handle the two file formats.

With the exemplary extensible loader, the loader may be easily and quickly modified to include logic that may assist in tracking licenses, copied software, etc.

Methodological Implementation of the Exemplary Extensible Loader

Figure 4:
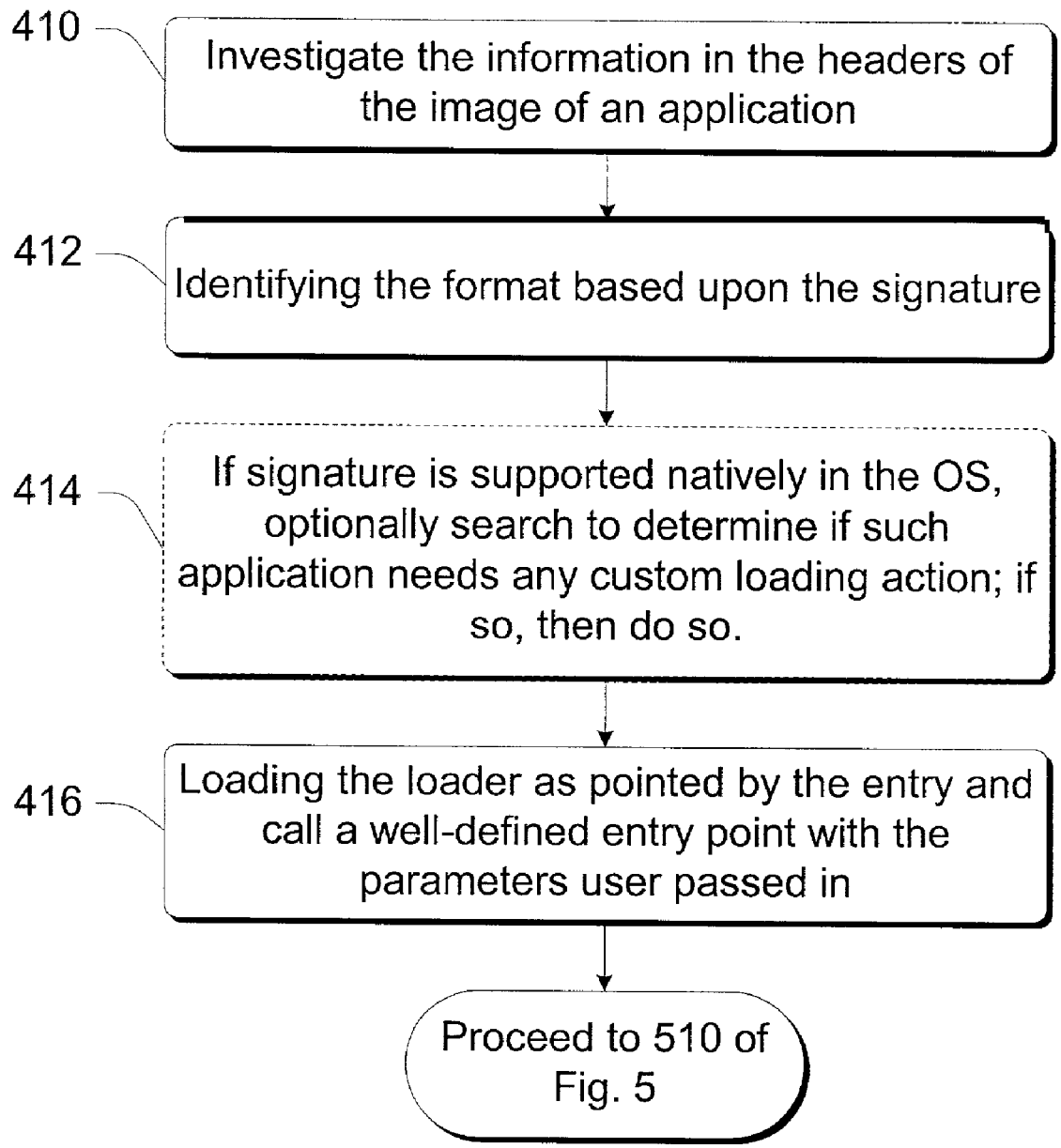
FIG. 4 is a flow diagram showing a methodological implementation in accordance with an implementation described herein.
Figure 5:
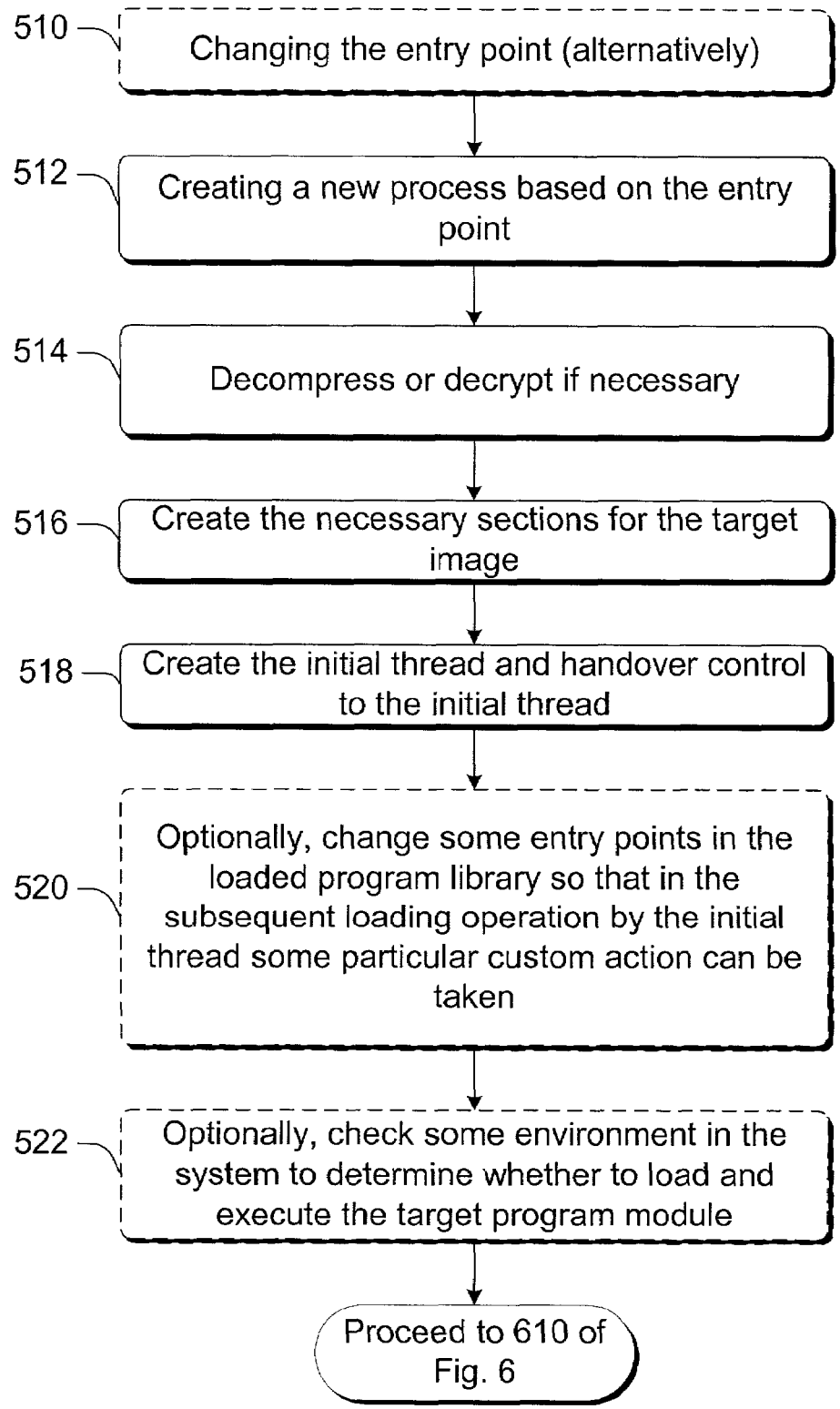
FIG. 5 is a flow diagram showing a methodological implementation in accordance with an implementation described herein.
Figure 6:
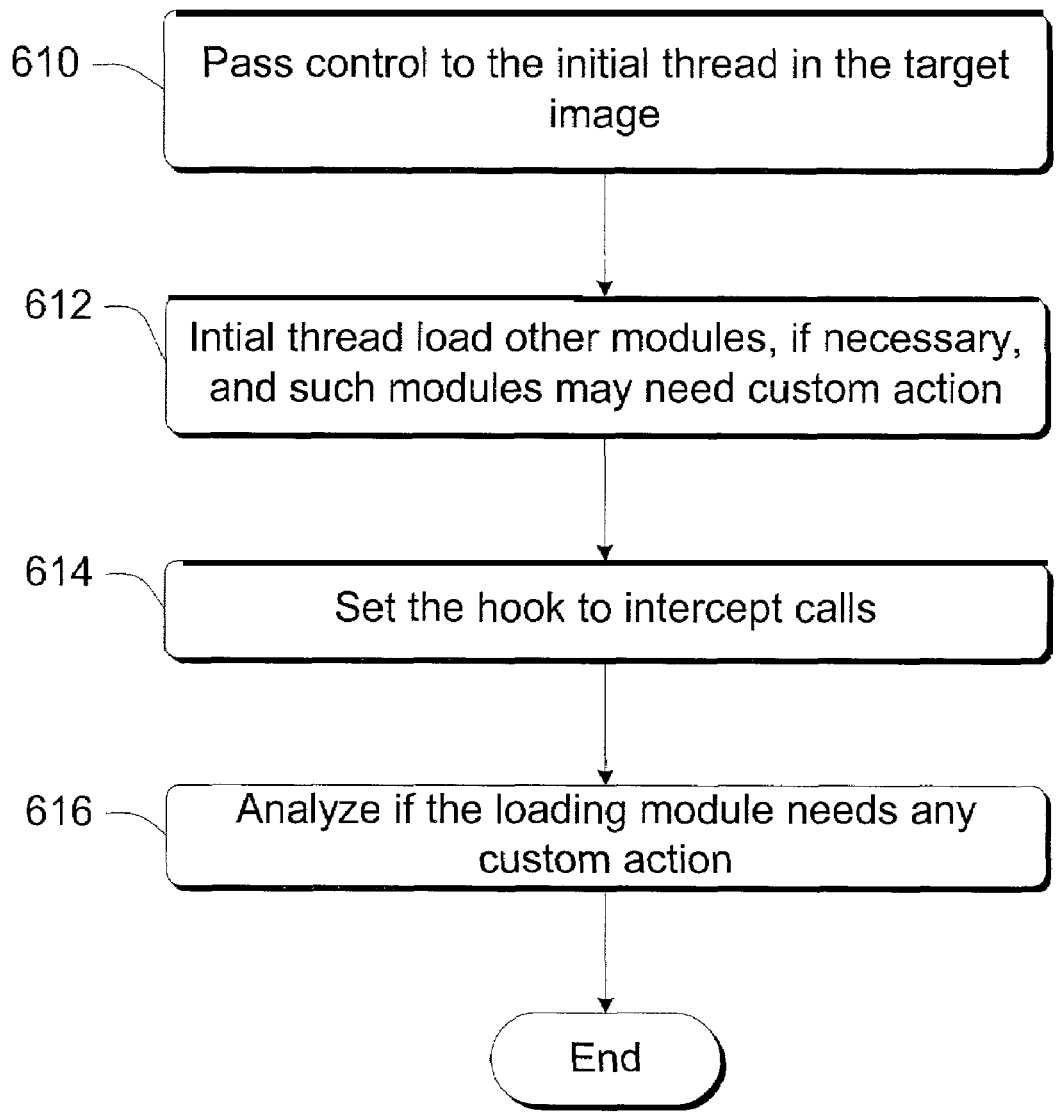
FIG. 6 is a flow diagram showing a methodological implementation in accordance with an implementation described herein.

FIGS. 4-6 show methodological implementations of the exemplary extensible loader performed by the modularized loader 200 (or some portion thereof). These methodological implementations may be performed in software, hardware, or a combination thereof.

FIG. 4 focuses on the initialization process, which occurs before the loading and executing of the executable image.

When user attempts to "run" an application (or when any other program module is invoked), the OS investigates the information in the headers of the image of such application. More specifically, it examines the signature. This occurs at block 410.

At 412, the signature identifies the specific image format. The loader may, for example, determine if the signature is different from the native signature. If so, it will try to search for an entry in a configuration database that matches the signature. That match identifies the image format. The configuration database is extensible so that additional file format definitions may be added to the database of multiple file format definitions.

At 414, if the signature is supported natively in the OS, it can optionally search the table by the application name to determine if it needs any custom loading action. This pass is optional and may be particularly helpful in the debug environment developer can activate this option.

At 416, the OS then loads the exemplary extensible loader as pointed by the entry and then calls a well-defined entry point with the parameters user passed in.

Assume, for example, that "myapps.exe" might be an application with signature "0x 4567" and the entry specifies: <0x 4567, c:\windows\system32\loader\myloader.dll"

When the user types the command "myapps.exe -myparam", the native loader will load the program library (i.e., the "dll" file) from c:\windows\system32\loader\myloader.dll and call the entry point with the location of "myapps.exe" and "-myparam" as parameter list.

FIG. 5 focuses on the loading process, which occurs before the executing of the executable image.

At 510, alternatively, the exemplary extensible loader may change the entry points in the loaded program libraries so that certain call might go at different location than the default location. This might work as a call redirection.

At 512, once the entry point gets control over the loading process, it calls a function to create a process (e.g., "CreateProcess" or similar API supported in the system) or implement that functionality on its own.

The target modules might have dependency on some other module, however it should be able to load different program libraries (i.e., the "dll" files) or module as required.

If an ISV changed some system program libraries to intercept the calls, they could accomplish that by modifying the exemplary extensible loader so that it can change the behavior on the fly and that can be controlled programmatically.

At 514, if sections of image are encrypted or compressed, the exemplary extensible loader decrypts or decompresses it so that instructions in the image can be understood.

At 516, the exemplary extensible loader creates the necessary sections for the target image. At 518, the exemplary extensible loader creates the initial thread and handover control to the initial thread. At 518, the exemplary extensible loader may change some entry points in the loaded program library so that in the subsequent loading operation by the initial thread some particular custom action can be taken. This enables the loader extension to implement custom actions such as API interception hooks.

At 520, the exemplary extensible loader may check some environment in the system to determine whether to load and execute the target program module. For example, ISV might license some executable for a particular CPU. The loader can check the license file against the host CPU identification and decide if it should allow loading and running the program. With exemplary extensible loader they need not to change anything in the code rather they can have a single loader and one license file or encoded program and combination of them can only be run in a particular machine or environment.

To do that custom interception, there may be a set of API support.

FIG. 6 focuses on the executing process, which occurs after the loading of the executable image.

At 610, once the exemplary extensible loader is done with the initial custom loading and setting hook for subsequent loading, the initial thread in the target image get control.

At 612, the initial thread then might load other modules, which might need custom action.

At 614, while initial thread loads a particular module, the hook is set initially so that it can intercept the call.

For example, with an API parameter validation layer, the loader would normally bind calls from an application directly to the OS-supplied DLL that implements the APIs, but a custom loader extension may instead bind those calls to a new DLL that does the strict parameter checking, then passes the call on to the OS-supplied DLL. Existing tools that do this usually have to edit the EXE on disk to change the name of the DLL to import the API from.

At 616, the hook may analyze if the loading module needs any custom action, like decoding on the fly, check security etc.

The hook might intercept some other call in the system like redirecting configuration database access or input/output (I/O) so that some custom action can be taken to take I/O and configuration database information from another location overriding the default action.

The alternative to the hook (for subsequent loading) might have similar support to customize subsequent module load. Using the hook with some API support loading process can be optimized where target module is dependent on dozens of modules that need custom action. Each time, loading the entire loader might take long time.

At 620, once all modules get loaded the initial thread might create more threads, load more modules and just execute normally like a normal program.

Exemplary Computing System and Environment

FIG. 7 illustrates an example of a suitable computing environment 900 within which an exemplary extensible loader, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary extensible loader may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary extensible loader may be described in the general context of computer-executable instructions, such as program modules, being executed by a computer. Generally, program modules include routines, programs, objects, components, data structures, etc. that perform particular tasks or implement particular abstract data types. The exemplary extensible loader may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 7 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a file locator, a file-format recognizer, a memory-mapper, an importer, an exporter, a binder, a searcher, a format recognizer, a sub-loader, and a database.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary extensible loader may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 900 in which an exemplary extensible loader may be implemented. Specifically, the exemplary extensible loader (s) described herein may be implemented (wholly or in part) by any program modules 928-930 and/or operating system 926 in FIG. 7 or a portion thereof.

The operating environment is only an example of a suitable operating environment and is not intended to suggest any limitation as to the scope or use of functionality of the exemplary extensible loader (s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary extensible loader may be stored on or transmitted across some form of computer readable media. Computer readable media can be any available media that can be accessed by a computer. By way of example, and not limitation, computer readable media may comprise "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable storage medium having computer-executable modules stored thereon, the modules respectively configuring a computer to perform acts comprising:
   configuring a file locator to locate an executable image on a computer media;
   configuring a file-format recognizer to recognize a file format of the executable image from amongst a database of multiple file format definitions, wherein the database is extensible so that additional file format definitions may be added to the database of multiple file format definitions;
   configuring a memory-mapper to open the executable image from the computer media and read it into a computer memory;
   configuring an importer to find a list of executable image names to load;
   configuring an exporter to build a representation of program modules that an executable image exports;
   configuring a binder to link multiple executable images together, such images being those of the list of executable image names.

2. A computer-readable storage medium as recited in claim 1, wherein the importer is further configured to direct the loading of multiple executable images of the list of executable image names to load.

3. A computer-readable storage medium as recited in claim 1, wherein the file-format recognizer is further configured to select one or more of a group of available pluggable sub-loaders capable of loading the recognized file format of the executable image.

4. A loader comprising a computer-readable storage medium as recited in claim 1.

5. An operating system comprising a computer-readable storage medium as recited in claim 1.

6. A computer comprising a computer-readable storage medium as recited in claim 1.

7. A computer-readable storage medium having computer-executable modules stored thereon, the modules respectively configuring a computer to perform acts comprising:
   configuring a searcher to search a computer media for an executable image for loading;
   configuring a format recognizer to recognize a format of the executable image;
   configuring a memory-mapper to load and map the executable image into memory based upon the format of the executable image;
   configuring a sub-loader to examine a data structure of the executable image to determine whether to load additional images;
   configuring a database of multiple executable-image formats which is the basis for which the format recognizer recognizes the format of the executable image and for which the memory-mapper varies how it loads and maps the executable image into memory, wherein the database is extensible so that additional executable-image formats may be recognized by the format recognizer and loaded and mapped by the memory-mapper.

8. A computer-readable storage medium as recited in claim 7, wherein one or more modules of the medium are configured to be replaced with a replacement module without recompilation of one or more modules.

9. A computer-readable storage medium as recited in claim 7, wherein the memory-mapper is further configured to convert the executable image before mapping it into the memory.

10. A computer-readable storage medium as recited in claim 7, wherein the memory-mapper is further configured to decrypt the executable image before mapping it into the memory.

11. A loader comprising a computer-readable storage medium as recited in claim 7.

12. An operating system comprising a computer-readable storage medium as recited in claim 7.

13. A computer comprising a computer-readable storage medium as recited in claim 7.

14. A computer implemented method facilitating loading of one or more executable images of varying formats, the method comprising:
   locating an executable image on a computer-readable storage media;
   investigating information related to the executable image, thereby identifying the format of the executable image, wherein:
      during the investigating, accessing an extensible database of executable-image formats; and
      the investigating accesses a header of the executable image in order to identify the format;
   initiating an extensible loader associated with the identified format, wherein the extensible loader:
      is pointed to by an entry; and
      comprises a plurality of modules that are selectively combined to accommodate executable image formats not supported by the native operating system, each module including at least one component designed for a specific executable image format;

loading the executable image into a computer memory using the extensible loader, wherein the loading comprises:

calling an entry point located in loaded program libraries in order to load the executable image;

creating a new process based on the entry point;

creating necessary sections within the loaded program libraries for the executable image;

creating an initial thread for the executable image; and handing over control from the extensible loader to the initial thread in order to execute the executable image.

15. A computer-readable storage medium storing instructions that, when executed, configure a computer to perform the method of claim 14.

16. A computer comprising a processor configured to perform the method of claim 14.

* * * * *